3,019,160
HALOGLYCOLURIL BACTERICIDAL COMPOSITIONS FOR DISINFECTING AND BLEACHING

Frank B. Slezak and Irving Rosen, Painesville, Ohio, assignors to Diamond Alkali Company, Cleveland, Ohio, a corporation of Delaware
No Drawing. Filed May 11, 1959, Ser. No. 812,133
11 Claims. (Cl. 167—33)

This invention relates to novel haloglycolurils and more particularly relates to the novel compounds comprising polyhaloglycolurils of the following structure:

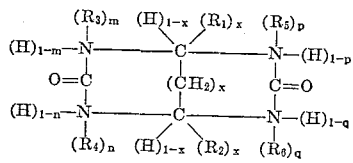

wherein $x$, $m$, $n$, $p$ and $q=0$ or 1, $R_1$ and $R_2$ are alkyl groups and $R_3$, $R_4$, $R_5$ and $R_6$ are halogen, and to their preparation and application. In most instances, $R_1$ and $R_2$ are the same or different lower alkyl groups such as a methyl group although they may contain up to about four carbon atoms since as the chain length increases, the product generally is less soluble in water and often is more difficult to prepare.

This application is a continuation-in-part of my co-pending application Ser. No. 635,615, filed January 23, 1957.

Specific illustrative compounds embodying this invention are:

2,4,6,8 - tetrachloro - 2,4,6,8 - tetrazabicyclo(3.3.0)octa-3,7-dione

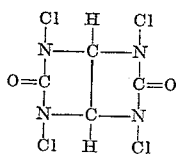

1,5-dimethyl - 2,4,6,8 - tetrachloro-2,4,6,8-tetrazabicyclo-(3.3.1)nona-3,7-dione

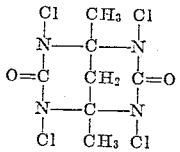

Dichloro - 2,4,6,8 - tetrazabicyclo(3.3.0)octa-3,7-dione

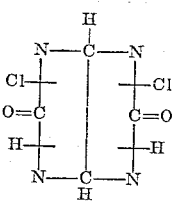

Compounds of this invention have a high available chlorine content and are characterized by a single activity as bleaches, sanitizers, i.e., in applications wherein the compound employed reduces the number of microorganisms on an inanimate object or surface to a safe level, and in disinfecting and bactericidal applications generally, as well as in verious biologically active compositions such as fungicides and nematocides. Of particular interest is the bleaching and sanitizing activity of compounds of this invention which is further enhanced by the fact that compounds of this invention generally are solids and thus inherently provide a significant improvement over many prior conventional bleaching and sanitizing agents including the well-known and widely used sodium hypochlorite solution. Moreover, the fact that compounds of this invention are solids provides increased convenience by way of easier handling, reduced likelihood of incurring damage by breakage, freezing or spilling.

Moreover, compounds of this invention generally are characterized by excellent stability so that their activity is not significantly reduced on storage although in some instances, these compounds appear somewhat less stable after extended storage in the presence of alkaline materials under conditions wherein chemical reaction therewith can occur.

Compounds of this invention generally may be prepared by halogenating a glycoluril or an alkyl-substituted glycoluril desirably in an alkaline aqueous solution rendered alkaline by addition of an alkali metal carbonate, e.g., sodium carbonate, alkali metal bicarbonate, e.g., sodium bicarbonate, or alkali metal hydroxide, e.g., sodium hydroxide, alkali metal borates, e.g., sodium borate, alkali meal silicates, e.g., sodium metasilicate, preferably an alkali metal carbonate, all as will be described more specifically hereinafter.

It is also a specific feature of this invention that compounds of the foregoing type are advantageously employed, not only singly, but in admixture wherein in many instances a synergistic effect is observed insofar as bleaching and sanitizing activity is concerned.

One of the most advantageous applications of compounds of this invention is in compositions useful in bleaching, sterilizing, bacterial toxicant, and detergent applications. Hence, it will be understood that compounds of this invention are useful when mixed with water and in certain instances with other liquids to yield materials suitable for bleaching, sterilizing and disinfecting such as in the treatment of food containers, e.g., metal and other type containers used in the transport of food products such as milk, cream and the like, as well as in oxidizing type detergents for use in hospitals and other places such as hotels and restaurants for dishwashing and the like where a product having a high available chlorine content is desirable.

Accordingly, in view of the variety of advantageous applications of compounds of this invention, it will be understood that the novel haloglycolurils may be employed as ingredients in compositions which also contain a major, or minor, although usually a major proportion, of other substances, preferably readily water soluble, such as alkali metal salts, alkaline earth metal salts and/or other alkali salts such as alkali metal carbonates, silictes, phosphates and the like, e.g., sodium or potassium carbonates, bicarbonates, silicates, phosphates and the like. The alkaline materials serve to provide a desirable pH at which the compounds are often more soluble and in many instances, also provides advantageous detergent or washing properties in solution.

In this connection, it will be appreciated that various alkaline phosphates including alkali metal phosphates and alkaline earth metal phosphates useful in detergent compositions such as sodium tripolyphosphates, sodium pyrophosphates, trisodium phosphates and the like, may be incorporated into compositions advantageously including also one or more compounds of this invention. Similarly, it will be understood that the various alkaline silicates, notably alkali metal silicates such as alkali metal metasilicates as well as those silicates having an alkali metal oxide: silicon dioxide ratio within the range from about 2.1:1.0 to 1.0:3.3, may be utilized, e.g., sodium silicate having $Na_2O:SiO_2$ ratios within the range from $2.0Na_2O:1.0SiO_2$ to $1.0Na_2O:3.3SiO_2$.

In addition to these detergent ingredients, it will be further understood that various organic wetting agents such as alkyl aryl sulfonates, e.g., sodium dodecyl benzene sulfonate, alkyl phenoxyethylene alkanols, alkyl aryl polyether alcohol, or other wetting agents or surface-active materials may be included as well as soaps, fillers, abrasives and water softening agents of organic or inorganic type incorporated as desired to provide specific properties required in a particular application.

Further, it will be appreciated that compositions of this invention particularly adapted in the sterilization, disinfectant, bleaching and detergent applications may either be dry particulate materials ranging from finely-divided powders to granular materials of increased particle size to pastes and liquid slurries and/or solutions, depending on the application intended.

It will be appreciated, of course, that in the variety of applications contemplated for compounds of this invention the proportions of these compounds with respect to the other ingredients employed can be varied. However, it may be stated that in many applications the novel haloglycolurils of this invention desirably will comprise minor amounts of about 1% by weight or less, up to about 10%, based on the total composition employed, frequently in amounts constituting a small but effective quantity appreciably less than 1%, up to a much greater proportion dictated by a number of factors including cost, application, equipment and other considerations, e.g., as high as 100% in certain instances where the pure material is advantageously utilized.

In other applications, for example, in which the compounds of this invention advantageously are utilized as biologically active substances, somewhat similar considerations obtain, i.e., compounds of this invention may be utilized in biologically active compositions in which they constitute but a minor amount of the total composition, e.g., there may be employed as essential ingredients in various compositions including a major proportion of one or more diluents, extenders, fillers, conditioners, solvents or the like such as various dry materials including clay, diatomaceous earth, talc, spent catalyst, alumina silica materials, silica and the like, as well as liquids such as water and various organic liquids such as acetone, kerosene, benzene, toluene, xylene and other petroleum distillate fractions, isomers or mixtures thereof.

When liquid formulations are employed or dry materials prepared which are to be used in liquid form, it is desirable in certain instances, as in the case of compositions useful in sterilizing, disinfecting, bleaching and detergent applications, to employ a wetting, dispersing, or other surface-active agent to facilitate use of the formulation.

Accordingly, the term "carrier" as employed throughout the specification and claims is intended to refer broadly to the material or materials constituting a major proportion of a biologically active or other formulation and hence includes finely divided materials, both liquids and solids, as aforementioned, conventionally used in such an application.

In order that those skilled in the art may more completely understand the present invention and the preferred methods by which the same may be carried into effect, the following specific examples are offered:

EXAMPLE I

Part A

PREPARATION OF 2,4,6,8-TETRACHLORO-2,4,6,8-TETRAZABICYCLO (3.3.0) OCTA-3,7-DIONE

Into 2 liters of water containing 50 gms. of sodium bicarbonate is introduced and suspended 71 gms. (0.5 mol) of glycoluril. The resultant mixture is chlorinated while continuously being agitated, sodium bicarbonate solution (150 gms. sodium bicarbonate in 2 liters of water) being added at a rate to maintain the pH of the solution between 4 and 8. Chlorination is continued until 130% of the stoichiometric amount of chlorine is introduced, i.e., a total of 182 gms. The resultant solid is separated, washed with about 1600 ml. of water, dried partially under suction for 10 to 15 minutes and then allowed to air dry. The resultant product weighs 132 gms. after drying. Chemical analysis indicates preparation of the desired product which contains 98.9% available chlorine as compared with the theoretical available chlorine of 101.4%.

Part B

There are added to 300 ml. of water 8.0 gms. (0.094 mol) sodium bicarbonate and 2.8 gms. (0.02 mol) glycoluril. This mixture is heated to 50°–55° C. and has an initial pH of 8.0. Chlorination is then begun (pH 8.0) and is continued to a pH of 3.3. The resultant white solid is separated, washed with 75 ml. of water, filtered again and allowed to dry under suction. Chemical analysis indicates preparation of the desired $C_4H_2Cl_4N_4O_2$ and is as follows:

| Element | Percent calculated | Percent actual |
|---|---|---|
| C | 17.16 | 17.47 |
| H | 0.72 | 0.80 |
| Cl | 50.67 | 50.2 |
| N | 20.02 | 20.24 |
| Available chlorine | 101.4 | 98.1 |

EXAMPLE II

PREPARATION OF DICHLORO-2,4,6,8-TETRAZABICYCLO (3.3.0) OCTA-3,7-DIONE

There is suspended in 800 ml. of water 14.2 gms. (0.1 mol) of glycoluril and the introduction of chlorine is begun, a 6 N solution of NaOH being added portionwise to maintain the pH within the range from 7 to 8. A total of 89.2% of the theoretical amount of chlorine (based on stoichiometric amount required to form trichloroglycoluril), and 45 ml. of 6 N NaOH introduced. The resultant material is filtered and the filtrate evaporated to dryness to yield 34.8 gms. of a white solid. This solid is washed twice with water and dried under suction. There results 17.1 gms. of a white solid. Chemical analysis indicates preparation of the desired $C_4H_4Cl_2N_4O_2$ and is as follows:

| Element | Percent calculated | Percent actual |
|---|---|---|
| C | 22.76 | 22.46 |
| H | 1.91 | 1.56 |
| Cl | 33.63 | 35.1 |
| N | 26.54 | 25.95 |
| Available chlorine | 68.08 | 69.1 |

EXAMPLE III

PREPARATION OF 1,5-DIMETHYL-2,4,6,8-TETRACHLORO-2,4,6,8-TETRAZABICYCLO (3.3.1) NONA-3,7-DIONE

Into 3 liters of water is introduced 56 gms. (0.3 mol) of 1,5-dimethyl - 2,4,6,8 - tetrazabicyclo(3.3.1)nona-3,7-dione (Rec. trav. chim. 27, 162–91 (1908)). Chlorine is then gradually introduced into the stirred solution simultaneously with the addition of 6 N sodium hydroxide at a rate to maintain the pH of the reaction mixture within the range from approximately 5 to 8. A total of 130% of the theoretical amount of chlorine (110 gms.) and 125% of the theoretical amount of 6 N sodium hydroxide (250.2 ml.) are added. The resultant reaction mixture is filtered and the pasty residue washed with 400 to 600 ml. of water and filtered again. The thus-obtained solid is allowed to dry to yield a white powder weighing 86.8 gms. Chemical analysis indicates that it contains 78.3% available chlorine (theoretical available chlorine 88%). Chemical analysis indicates preparation of the desired $C_7H_8Cl_4N_4O_2$ and is as follows:

| Element | Percent actual | Percent calculated |
|---|---|---|
| C | 27.49 | 26.10 |
| H | 2.51 | 2.50 |
| Cl | 40.3 | 44.08 |
| N | 18.19 | 17.39 |

Bleaching effectiveness of compounds of this invention:

EXAMPLE IV

Part A

To illustrate the effectiveness of compounds of this invention as bleaching agents tests are conducted whereby tea-stained, unbleached muslin is bleached in solutions containing such compounds. More particularly, the procedure employed is as follows:

Unbleached muslin is scoured for six hours at the boil in nine liters of a 1% NaOH solution containing 20 gms. of Nacconal NR (alkyl aryl sulfonate) and 2.0 gms. of Rapidase-Z (starch and size-removing bacteria). The thus-scoured muslin (465 gms.) is then stained by immersion in a solution consisting of nine liters of water containing 140 ml. of a stock tea solution prepared by leaching 15 conventional tea bags in one liter of water for 35 minutes at 97° C. The thus-treated cloth is then rinsed in cold water and dried.

Bleach baths are prepared by adding sufficient of a saturated aqueous solution of the compound being investigated to provide a bath 300 ml. in volume and containing 100 p.p.m. of available chlorine, using a 5% aqueous solution of sodium tripolyphosphate to buffer the bath to a pH of about 9.4. The available chlorine content is checked just prior to conducting the tests by titration against sodium thiosulphate using starch as an indicator.

Using such bleach solutions in glass jars, one strip (9 x 7 inches) of unbleached, scoured, tea-stained muslin is immersed in each bath and the jar placed in the water bath of a Launder-Ometer (Atlas Electric Devices Company) (Model B-5, Type LHD-EF) for twenty minutes at a predetermined test temperature. The muslin is then washed with cold tap water, dried, and the bleach effectiveness determined by measuring the reflectance of the bleached samples with a reflectometer (Hunter Multipurpose Reflectometer). Using this procedure, tests are conducted at temperatures of 80° F., 100° F., 120° F., 140° F., and 160° F. The resultant data, presented as percent whiteness increase, are as follows:

| Bleach mixture | Whiteness increase percent ||||| 
|---|---|---|---|---|---|
| | 80° F. | 100° F. | 120° F. | 140° F. | 160° F. |
| Dichloro-2,4,6,8-tetrazabicyclo(3.3.0)octa-3,7-dione | 19.6 | 22.8 | 24.2 | 25.7 | 27.8 |
| 2,4,6,8-tetrachloro-2,4,6,7-tetrazabicyclo (3.3.0) octa-3,7-dione | 25.4 | 28.6 | 30.3 | 29.5 | 32.1 |

Part B

To illustrate the synergistic effect obtained by combining two compounds of this invention, experiments are carried out wherein a mixture of dichloro-2,4,6,8-tetrazabicyclo(3.3.0)-octa-3,7-dione and 2,4,6,8-tetrachloro-2,4,6,8-tetrazabicyclo (3.3.0)-octa-3,7-dione is employed in bleaching tests as described hereinbefore. The results of such tests indicate that more effective bleaching is obtained with this mixture than with either compound alone. Using the procedure described in connection with Example IV, there are obtained the following data:

| Parts by weight | Bleach mixture | Whiteness increase (percent) |||||
|---|---|---|---|---|---|---|
| | | 80° F. | 100° F. | 120° F. | 140° F. | 160° F. |
| 75 | Dichloro-2,4,6,8-tetrazabicyclo(3.3.0)octa-3,7-dione | 25.2 | 22.1 | 31.0 | 31.1 | 31.9 |
| 25 | 2,4,6,8-tetrachloro-2,4,6,8-tetrazabicyclo (3.3.0) octa-3,7-dione | | | | | |
| 50 | Dichloro-2,4,6,8-tetrazabicyclo(3.3.0)octa-3,7-dione | 25.3 | 27.6 | 32.0 | 34.0 | 35.6 |
| 50 | 2,4,6,8-tetrachloro-2,4,6,8-tetrazabicyclo (3.3.0) octa-3,7-dione | | | | | |

EXAMPLE V

Using 2,4,6,8-tetrachloro-2,4,6,8-tetrazabicyclo(3.3.0) octa-3,7-dione as a test fungicide spore germination tests on glass slides are conducted via the test tube dilution method adopted from the procedure wherein the test chemical, in aqueous formulations at concentrations of 1000, 100, 10 and 1.0 p.p.m. is tested for its ability to inhibit germination of spores from 7- to 10-day-old cultures of *Alternaria oleracea* and *Monilinia fructicola*. These concentrations refer to initial concentrations before diluting four volumes with one volume of spore stimulant and spore suspension.

Germination records are taken after 20 hours of incubation at 22° C. by counting 100 spores. The test compound is rated on its ability to inhibit germination of half of the spores, i.e., the so-called "ED-50 value," in the test drops.

Using the above procedure, ED-50 values between 0.1 and 1.0 p.p.m. are obtained, indicating a high degree of fungicidal activity.

EXAMPLE VI

The tomato foliage disease test measures the ability of a test compound to protect tomato foliage against infection by the early blight fungus *Alternaria solani* and employs tomato plants 5 to 7 inches high of the variety Bonny Best. Duplicate plants are sprayed with 100 ml. of the test formulation at 2000 and 400 p.p.m. (2000 or 400 p.p.m. 2,4,6,8 - tetrachloro - 2,4,6,8 - tetrazabicyclo (3.3.0)octa - 3,7 - dione—5% acetone—0.01% Triton X-155—balance water) at 40 lbs. air pressure while being rotated on a turntable in a spray chamber.

After the spray deposit is dry, the treated plants and comparable untreated controls (sprayed with formulation less toxicant) are sprayed with a spore suspension containing approximately 20,000 conidia of *Alternaria solani* per ml. The atomizer used delivers 20 ml. in a 30-second exposure period. The plants are held in a saturated atmosphere for 24 hours at 70° F. for early blight to permit spore germination and infection before removal to the greenhouse. After 2 to 4 days, lesion counts are made on the three uppermost fully expanded leaves. The data are converted to percentage disease control based on the number of lesions obtained on the control plants.

Using the above procedure, a 100% disease control is obtained at 2000 p.p.m. while 99% disease control is obtained at 400 p.p.m., thus indicating a high degree of fungicidal activity in protecting tomato foliage.

EXAMPLE VII

To illustrate nematocidal activity of compounds of this invention, composted greenhouse soil in ½ gallon glazed crocks is infested with 3–5 gms. of knotted or galled tomato roots afflicted with root knot nematode (Meloidogyne sp.). Treatment of an equivalent rate of 512 lbs. per acre (770 mg. per crock) is effected by mixing 2,4,6,8 - tetrachloro-2,4,6,8-tetrazabicyclo(3.3.0)octa-3,7-dione intimately with the soil. An indicator crop of either squash or tomato is planted in the crocks 4 to 7 days after treatment and the degree of knotting or galling is used as an index of the nematocidal activity of the material. A rating system of 0 for none to 5 for severe infestation comparable to controls is used to report results of tests.

Using the above procedure, it is observed that a 0 phytotoxicity rating is obtained and a nematode infection of 0.5 is observed, this later rating in contrast to a nematode infestation rating of 4.7 for an untreated infested check sample.

EXAMPLE VIII

Non-plant parasitic nematodes (*Panagrellus redivivus*) are exposed to 2,4,6,8-tetrachloro-2,4,6,8-tetrazabicyclo-(3.3.0)octa-3,7-dione (1000 p.p.m. aqueous formulation) in small watch glasses (27 mm. dia. x 8 mm. deep) within a 9 cm. Petri dish, and results are recorded 24 hours after treatment. With the above procedure, a nematode mortality of 100% is observed.

EXAMPLE IX

To indicate fungicidal activity of dichloro-2,4,6,8-tetrazabicyclo(3.3.0)octa-3,7-dione, spore germination tests on glass slides are conducted using this compound by employing the test chemical in aqueous formulations at concentrations of 1000, 100, 10 and 1.0 p.p.m. in tests to determine its ability to inhibit germination of spores from 7- to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. The test compound is rated on its ability to inhibit germination of half of the spores, i.e., the so-called "ED–50 value" in the test drops. Using the above procedure, an ED–50 value of 10 to 100 p.p.m. is obtained, thus indicating a marked degree of fungicidal activity.

EXAMPLE X

To indicate fungicidal effectiveness of 1,5-dimethyl-2,4,6,8 - tetrachloro - 2,4,6,8-tetrazabicyclo(3.3.1)nona-3,7-dione, spore germination tests on glass slides are conducted using this compound by employing the test chemical in aqueous formulations at concentrations of 1000, 100, 10 and 1.0 p.p.m. in tests to determine its ability to inhibit germination of spores from 7- to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. The test compound is rated on its ability to inhibit germination of half of the spores, i.e., the so-called "ED–50 value" in the test drops. Using the above procedure, an ED–50 value rating against the two organisms of 10 to 100 p.p.m. and 1 to 10 p.p.m., respectively, is observed, thus indicating a high degree of fungicidal activity.

EXAMPLE XI

The tomato foliage disease test measures the ability of a test compound to protect tomato foliage against infection by the early blight fungus *Alternaria solani* and the late blight fungus *Phytophthora infestans*. The method employs tomato plants 5 to 7 inches high of the variety Bonny Best. Duplicate plants, one set for each test fungus, are sprayed with 100 ml. of the test formulation at 2000 and 400 p.p.m. (2000 or 400 p.p.m. dichloro-2,4,6,8 - tetrazabicyclo(3.3.0)octa - 3,7-dione—5% acetone—0.01% Triton X–155—balance water) at 40 lbs. air pressure while being rotated on a turntable in a spray chamber.

After the spray deposit is dry, the treated plants and comparable untreated controls (sprayed with formulation less toxicant) are sprayed with a spore suspension containing approximately 20,000 conidia of *Alternaria solani* per ml. or 150,000 sporangia of *Phytophthora infestans* per ml. The atomizer used delivers 20 ml. in a 30-second exposure period. The plants are held in a saturated atmosphere for 24 hours at 70° F. for early blight and 60° F. for late blight to permit spore germination and infection before removal to the greenhouse. After 2 to 4 days, lesion counts are made on the three uppermost fully expanded leaves. The data are converted to percentage disease control based on the number of lesions obtained on the control plants. Using the above procedure, the percentage disease control of early blight at the two concentrations is 98% and 62%, respectively. Percentage disease control of the late blight at these concentrations is 100 and 99%, respectively.

EXAMPLE XII

The tomato foliage disease test measures the ability of a test compound to protect tomato foliage against infection by the early blight fungus *Alternaria solani*. The method employs tomato plants 5 to 7 inches high of the variety Bonny Best. Duplicate plants are sprayed with 100 ml. of the test formulation at 2000 and 400 p.p.m. (2000 or 400 p.p.m. 1,5-dimethyl-2,4,6,8-tetrachloro-2,4,6,8 - tetrazabicyclo(3.3.1)nona-3,7-dione—5% acetone—0.01% Triton X–155—balance water) at 40 lbs. air pressure while being rotated on a turntable in a spray chamber.

After the spray deposit is dry, the treated plants and comparable untreated controls (sprayed with formulation less toxicant) are sprayed with a spore suspension containing approximately 20,000 conidia of *Alternaria solani* per ml. The atomizer used delivers 20 ml. in a 30-second exposure period. The plants are held in a saturated atmosphere for 24 hours at 70° F. for early blight to permit spore germination and infection before removal to the greenhouse. After 2 to 4 days, lesion counts are made on the three uppermost fully expanded leaves. The data are converted to percentage disease control based on the number of lesions obtained on the control plants. Using the above procedure, a 100% disease control is observed at both concentrations employed.

EXAMPLE XIII

Non-plant parasitic nematodes (*Panagrellus redivivus*) are exposed to dichloro-2,4,6,8-tetrazabicyclo(3.3.0)-octa-3,7-dione (1000 p.p.m. aqueous formulation) in small watch glasses, (27 mm. dia. x 8 mm. deep) within a 9 cm. Petri dish and results are recorded 24 hours after treatment. Using the above procedure, a nematode mortality of 100% is observed.

EXAMPLE XIV

The bactericide is mixed with distilled water, containing 5% acetone and 0.01% Triton X–155, at a concentration of 1000 p.p.m. Five ml. of the test fomulation are put in each of 4 test tubes. To each tube is added one of the organisms: *Erwinia amylovora*, *Xanthomonas phaseoli*, *Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth incubated for 48 hours at 37° C. when growth is rated as follows: A=no growth, B=slight, C=moderate and D=heavy growth.

Using the above procedure, at the indicated concentrations, the following results are obtained:

| Bactericide | Concentration, p.p.m. | Growth rating of 4 organisms 48 hrs. after a 4-hour exposure to test compounds at 500 p.p.m. | | | |
|---|---|---|---|---|---|
| | | E. amylovora | X. phaseoli | S. aureus | E. coli |
| 2,4,6,8-tetrachloro-2,4,6,8-tetrazabicyclo(3.3.0)octa-3,7-dione | 128 | A | A | A | A |
| | 64 | A | A | A | A |
| | 32 | A | A | A | B |
| | [1]16 | A | A | A | A |
| | [1]8 | B | A | A | A |
| Dichloro-2,4,6,8-tetrazabicyclo(3.3.0)octa-3,7-dione | 128 | A | A | A | A |
| | 64 | C | A | A | A |
| | 32 | C | A | A | A |
| | [1]16 | B | A | A | A |
| | [1]8 | B | A | A | A |
| Roccal [2] | 256 | A | A | A | A |
| | 64 | C | A | B | A |
| | 16 | C | B | B | C |
| Clorox [3] | 128 | A | A | A | A |
| | 64 | A | A | A | A |
| | 32 | A | A | A | A |
| | [1]8 | A | A | A | A |
| Control | | D | D | D | D |

[1] Test organism concentration is 256 p.p.m.
[2] Roccal—benzalkonium chloride.
[3] Clorox—aqueous solution of sodium hypochlorite.

EXAMPLE XV

The following are illustrative specific bleaching and sanitizing formulations embodying the present invention and including 2,4,6,8-tetrachloro-2,4,6,8-tetrazabicyclo-(3.3.0)octa-3,7-dione, 1,5-dimethyl-2,4,6,8-tetrachloro-2,4,6,8-tetrazabicyclo(3.3.1)-nona-3,7-dione and/or dichloro-2,4,6,8-tetrazabicyclo(3.3.0)octa-3,7-dione.

BLEACHING AND SANITIZING FORMULATIONS

| | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| N-chloro compound | 25 | 25 | 25 | 25 | 255 | 25 | 25 | 25 | 25 | 25 | 25 | 25 | 25 | 25 | 25 | 25 | 25 | 25 | 25 | 25 | 25 |
| Sodium sulfate | 50 | 39 | 39 | 39 | 41 | 30 | 30 | 30 | 34 | 24 | 14 | 25 | 15 | 5 | 50 | 50 | 50 | 41 | 41 | 41 | |
| Monobasic sodium phosphate hydrate (NaH$_2$PO$_4$.H$_2$O) | 10 | 10 | 5 | | 10 | 10 | 5 | | | | | | | | 14 | 19 | 24 | 14 | 19 | 24 | |
| Sodium tripolyphosphate | 14 | 25 | 30 | 35 | 14 | 25 | 30 | 35 | 40 | 50 | 60 | 40 | 50 | 60 | 10 | 5 | | 10 | 5 | | 75 |
| Wetting agent (Di-Aqua)[1] | 1 | 1 | 1 | 1 | 10 | 10 | 10 | 10 | 1 | 1 | 1 | 10 | 10 | 10 | 1 | 1 | 1 | 10 | 10 | 10 | |

[1] Di-Aqua is a commercially available alkyl aryl sulfonate, typically a mixture of sodium keryl benzene sulfonate (40% or 80% by weight), e.g., sodium dodecyl benzene sulfonate, balance sodium sulfate.

It is to be understood that although the invention has been described with specific reference to particular embodiments thereof, it is not to be so limited, since changes and alterations therein may be made which are within the full intended scope of this invention as defined by the appended claims.

What is claimed is:

1. A composition of matter comprising a mixture of an alkaline material selected from the group consisting of alkali-metal carbonates, silicates and phosphates and a compound of the formula:

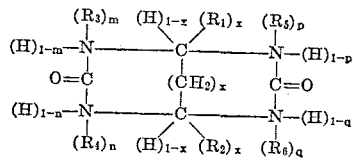

wherein $R_1$ and $R_2$ are alkyl groups; $R_3$, $R_4$, $R_5$ and $R_6$ are halogen; $x$, $m$, $n$, $p$ and $q$ are each numbers from 0 to 1, inclusive.

2. A composition of matter comprising a mixture of an alkaline material selected from the group consisting of alkali-metal carbonates, silicates and phosphates and dichloro-2,4,6,8-tetrazabicyclo(3.3.0)octa-3,7-dione.

3. A composition of matter comprising a mixture of an alkaline material selected from the group consisting of alkali-metal carbonates, silicates and phosphates and 2,4,6,8-tetrachloro-2,4,6,8-tetrazabicyclo(3.3.0)octa-3,7-dione.

4. A disinfecting and bactericidal composition comprising a major proportion of an alkaline phosphate detergent and about 1% to 25% of a compound of the formula:

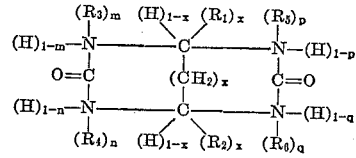

wherein $R_1$ and $R_2$ are alkyl groups; $R_3$, $R_4$, $R_5$ and $R_6$ are halogen; $x$, $m$, $n$, $p$ and $q$ are each numbers from 0 to 1, inclusive.

5. A disinfecting and bactericidal composition comprising about 5 to 50 parts of sodium sulfate, about 5 to 25 parts of monobasic sodium phosphate hydrate, about 5 to 60 parts of sodium tripolyphosphate, about 1 to 10 parts of an organic wetting agent and about 25 parts of a compound of the formula:

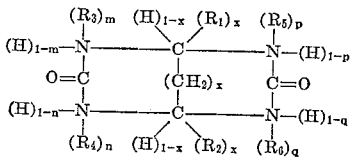

wherein $R_1$ and $R_2$ are alkyl groups; $R_3$, $R_4$, $R_5$ and $R_6$ are halogen; $x$, $m$, $n$, $p$ and $q$ are each numbers from 0 to 1, inclusive.

6. A bleach composition comprising an alkaline buffer selected from the group consisting of alkali-metal carbonates, silicates and phosphates and a mixture of two different compounds of the general formula:

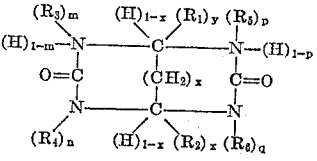

wherein $R_1$ and $R_2$ are alkyl groups; $R_3$, $R_4$, $R_5$ and $R_6$ are halogen; $x$, $m$, $n$, $p$ and $q$ are each numbers from 0 to 1, inclusive, said mixture containing 50% to 75% of one of the compounds and 50% to 25% of the second compound.

7. A bleach composition comprising an alkaline buffer selected from the group consisting of alkali-metal carbonates, silicates and phosphates and a synergistic mixture of 50% to 75% of dichloro-2,4,6,8-tetrazabicyclo-(3.3.0)octa-3,7-dione and 50% to 25% of 2,4,6,8-tetrachloro-2,4,6,8-tetrazabicyclo(3.3.0)octa-3,7-dione.

8. The method of disinfecting and destroying bacteria which comprises contacting the material to be disinfected with the composition of claim 1.

9. The method of disinfecting and destroying bacteria which comprises contacting the material to be disinfected with the composition of claim 2.

10. The method of disinfecting and destroying bacteria which comprises contacting the material to be disinfected with the composition of claim 3.

11. The method of disinfecting and destroying bacteria which comprises contacting the material to be disinfected with the composition of claim 4.

References Cited in the file of this patent

UNITED STATES PATENTS

| | | |
|---|---|---|
| 2,628,174 | Stokes | Feb. 10, 1953 |
| 2,638,434 | Adkins | May 12, 1953 |
| 2,897,154 | Low | July 28, 1959 |

FOREIGN PATENTS

| | | |
|---|---|---|
| 479,506 | Great Britain | Apr. 30, 1936 |

UNITED STATES PATENT OFFICE
CERTIFICATION OF CORRECTION

Patent No. 3,019,160  January 30, 1962

Frank B. Slezak et al.

It is hereby certified that error appears in the above numbered patent requiring correction and that the said Letters Patent should read as corrected below.

Column 1, line 66, for "single" read -- singular --; line 71, for "verious" read -- various --; column 2, line 72, for "2.1:1.0" read -- 2.0:1.0 --; column 10, lines 55 to 60, the formula should appear as shown below instead of as in the patent:

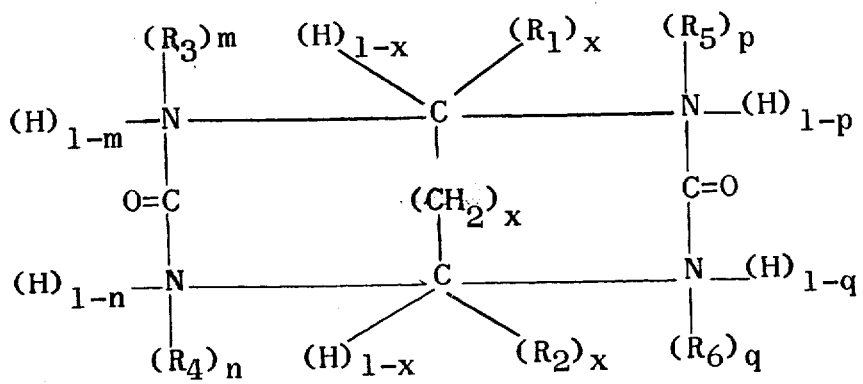

Signed and sealed this 3rd day of July 1962.

(SEAL)
Attest:

ERNEST W. SWIDER

Attesting Officer

DAVID L. LADD

Commissioner of Patents